(12) United States Patent
Chen et al.

(10) Patent No.: US 11,558,577 B2
(45) Date of Patent: Jan. 17, 2023

(54) METHOD FOR ADJUSTING WIDE VIEW ANGLE, DISPLAY PANEL AND COMPUTER READABLE STORAGE MEDIUM

(71) Applicant: HKC CORPORATION LIMITED, Shenzhen (CN)

(72) Inventors: Wei Chen, Shenzhen (CN); Lidan Ye, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 205 days.

(21) Appl. No.: 17/195,845

(22) Filed: Mar. 9, 2021

(65) Prior Publication Data
US 2022/0038652 A1 Feb. 3, 2022

(30) Foreign Application Priority Data
Jul. 28, 2020 (CN) .......................... 202010749460.X (51) Int. Cl.
*H04N 5/44* (2011.01)
*H04N 7/00* (2011.01)
*G09G 3/36* (2006.01)

(52) U.S. Cl.
CPC ............. *H04N 5/44* (2013.01); *G09G 3/3685* (2013.01); *H04N 7/002* (2013.01); *G09G 2320/068* (2013.01)

(58) Field of Classification Search
None
See application file for complete search history.

(56) References Cited

FOREIGN PATENT DOCUMENTS

| | | | |
|---|---|---|---|
| CN | 104795037 | A | 7/2015 |
| CN | 106297716 | A | 1/2017 |
| CN | 109166550 | A | 1/2019 |
| CN | 110164938 | A | 8/2019 |
| CN | 110415652 | A | 11/2019 |

OTHER PUBLICATIONS

First Office Action issued in counterpart Chinese Patent Application No. 202010749460.X, dated Feb. 10, 2021.

*Primary Examiner* — Aneeta Yodichkas
(74) *Attorney, Agent, or Firm* — Westbridge IP LLC (57) ABSTRACT

The application discloses a method for adjusting a wide viewing angle, including: obtaining gray scale values of two pixels located in a same column and two adjacent rows; obtaining a view angle value of a wide view angle, and determining a target difference value according to the view angle value; and reducing a gray scale value of one of the two pixels and/or increasing a gray scale value of another one of the two pixels according to the target difference value, to perform wide view angle adjustment of a picture to be displayed, wherein a difference value between the gray scale values of the two pixels after the wide view angle adjustment is greater than or equal to the target difference value. The application also discloses a display panel and a computer readable storage medium.

20 Claims, 3 Drawing Sheets

METHOD FOR ADJUSTING WIDE VIEW ANGLE, DISPLAY PANEL AND COMPUTER READABLE STORAGE MEDIUM

CROSS-REFERENCE TO RELATED APPLICATIONS

The present disclosure claims the benefit of Chinese Patent Application No. 202010749460.X, filed on Jul. 28, 2020, entitled "Method for Adjusting Wide View Angle, Display Panel and Computer Readable Storage Medium", the entire content of which is incorporated herein for reference.

TECHNICAL FIELD

The application relates to the technical field of display equipment, in particular to a method for adjusting a wide view angle, a display panel and a computer readable storage medium.

BACKGROUND

The statements herein only provide background information related to this disclosure and does not necessarily constitute prior art.

A wide view angle refers to a large visual angle, which is an important parameter of a display panel.

In the exemplary technique, each sub-pixel of the display panel is provided with a dark area and a bright area, and each of the dark area and the bright area is provided with a pixel charging circuit. When adjusting the wide view angle, the electric quantity of the pixel charging circuit corresponding to the dark area is partially discharged, so that the brightness of the dark area of the sub-pixel is less than 100%, and the brightness of the bright area is 100%. However, one sub-pixel needs to be equipped with the circuits and wires in the dark and bright areas, resulting in a small aperture ratio of the display panel. However, it needs to ensure the light transmittance of the display panel. When the aperture ratio is small, the area of the backlight strips needs to be increased, and the adjustment cost for the wide view angle of the display panel is relatively high.

SUMMARY

The main objective of the present application is to provide a method for adjusting a wide view angle, a display panel and a computer readable storage medium, aiming to solve the problem that an adjustment cost of the wide view angle of the display panel is relatively high.

In order to achieve the above objective, the present application provides a method for adjusting wide view angle, which includes the following operations:

obtaining gray scale values of two pixels located in a same column and two adjacent rows;

obtaining a view angle value of a wide view angle, and determining a target difference value according to the view angle value; and reducing a gray scale value of one of the two pixels and/or increasing a gray scale value of another one of the two pixels according to the target difference value, to perform wide view angle adjustment of a picture to be displayed, where a difference value between the gray scale values of the two pixels after the wide view angle adjustment is greater than or equal to the target difference value.

In one embodiment, the operation of determining a target difference value according to the view angle value includes:

obtaining a picture type of the picture to be displayed;

determining a target refresh rate according to the picture type;

determining the target difference value according to the target refresh rate and the view angle value; where the target refresh rate and the target difference value are positively correlated.

In one embodiment, the operation of determining the target difference value according to the target refresh rate and the view angle value includes:

obtaining a preset difference value according to the view angle value, and determining a correction parameter according to the target refresh rate; and correcting the preset difference value according to the correction parameter to obtain the target difference value.

In one embodiment, the operation of obtaining a preset difference value according to the view angle value includes:

determining a preset refresh rate; and determining the preset difference value according to the view angle value, the preset refresh rate and the gray scale values of the two pixels.

In one embodiment, the picture type includes a static picture and a dynamic picture, and the operation of determining a target refresh rate according to the picture type includes:

determining a preset refresh rate;

in responding to that the picture to be display is a static picture according to the picture type, reducing the preset refresh rate to obtain the target refresh rate;

in responding to that the picture to be display is a dynamic picture according to the picture type, increasing the preset refresh rate to obtain the target refresh rate.

In one embodiment, the operation of determining a picture type of the current display picture includes:

acquiring a previous display picture frame;

determining a second pixel of the previous display picture frame corresponding to a first pixel of a current display picture, and comparing a pixel value of the first pixel with a pixel value of the second pixels corresponding to the first pixel, where the current display picture is the picture to be displayed, and a display position of the first pixel and a display position of the second pixel corresponding to the first pixel is same on a display panel;

determining that the current display picture is a static picture according to the picture type in responding to that a number of first pixels whose pixel values are same as pixel values of corresponding second pixels is greater than a first preset number; and determining that the current display picture is a dynamic picture in responding to that a number of first pixels whose pixel values are different from pixel values of corresponding second pixels is greater than a second preset number.

In one embodiment, a total brightness value of the two pixels before the wide view angle adjustment is equal to a total brightness value of the two pixels after the wide view angle adjustment.

In one embodiment, after the operation of reducing a gray scale value of one of the two pixels and/or increasing a gray scale value of another one of the two pixels according to the target difference value, the method further includes:

saving a first target gray scale value of the one of the two pixels and a second target gray scale value of the another one of the two pixels after the wide view angle adjustment, thereby applying an overdrive voltage corresponding to the first target gray scale value and an overdrive voltage corresponding to the second target gray scale value to liquid crystal molecules corresponding to the two pixels respectively to display the two pixels.

To achieve that above objective, the present application also provides a display panel including a memory and at least one processor. The memory stores computer-executable instructions executable by the at least one processor, when the computer-executable instructions are executed by the at least one processor, the at least one processor is caused to perform the method for adjusting wide view angle described above.

To achieve the above objective, the application also provides a computer readable storage medium storing computer-executable instructions executable by at least one processor, when the computer-executable instructions are executed by the at least one processor, the at least one processor is caused to perform the method for adjusting wide view angle described above.

The application provides a wide view angle adjustment method, a display panel and a computer readable storage medium. The display panel acquires gray scale values of two pixels located in a same column and two adjacent rows, and then determine a view angle value of a wide view angle to determine a target difference value, so as to reduce a gray scale value of one of the two pixels, or increase a gray scale value of anther of the two pixels, or both reduce the gray scale value of the one of the two pixels and increase the gray scale value of the another of the two pixels according to the target difference value, to carry out wide view angle adjustment, and to make the difference value between the gray scale values of the two pixels after the wide view angle adjustment greater than or equal to the target difference value. Since the display panel integrates two pixels of the picture to be display located in a same column and two adjacent rows, and adjusts the difference value between the gray scale values of the two pixels to be greater than or equal to the target difference value, one pixel is darker and the other pixel is brighter, so as to meet users' demand for a wide view angle of a display picture without additional circuits and wires together with the circuits, and avoid to increase the area of the backlight lamp because of the reduction of aperture ratio. The adjustment cost of the display panel is lower.

The realization of purpose, functional features and advantages of the present disclosure will be further explained in connection with embodiments and with reference to the accompanying drawings.

DETAILED DESCRIPTION OF THE EMBODIMENTS

It should be understood that the specific embodiments described herein are intended to explain the application only and are not intended to limit the application.

A solution of an embodiment of the application is to obtain gray scale values of two pixels, where the two pixels are located in a same column and two adjacent rows; obtain an view angle value of a wide view angle, and determining a target difference value according to the view angle value, reduce a gray scale value of one of the two pixels and/or increase a gray scale value of the other one of the two pixels according to the target difference value, to perform wide view angle adjustment of a display picture, where a difference value between the gray scale values of the two pixels after the wide view angle adjustment is greater than or equal to the target difference value.

Since the display panel integrates two pixels of the display picture located in two adjacent rows and in a same column, and adjusts the difference value between the gray scale values of the two pixels to be greater than or equal to the target difference value, one pixel is darker and the other pixel is brighter, so as to meet users' demand for a wide view angle of a display picture without additional circuits and wires together with the circuits, and avoid to increase the area of the backlight lamp because of the reduction of aperture ratio. The adjustment cost of the display panel is lower.

Figure 1:
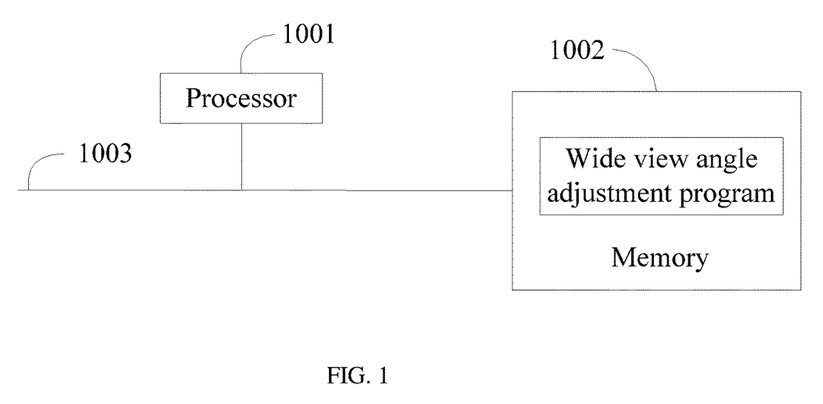
FIG. 1 is a schematic diagram of a hardware structure of a display panel according to an embodiment of the present application.

As one implementation, the display panel can be shown in FIG. 1.

The embodiments of the present application relate to a display panel, which includes a processor 1001 such as a CPU, a memory 1002, and a communication bus 1003. The communication bus 1003 is configured to enable connection and communication between those components.

The memory 1002 can be a high-speed RAM memory (Random Access Memory) or a stable memory (non-volatile memory), such as a magnetic disk memory. As shown in FIG. 1, the memory 1003, as a computer storage medium, can include a wide view angle adjustment program. The processor 1001 can be configured to invoke the wide view angle adjustment program stored in the memory 1002 and perform the following operations:

obtaining gray scale values of two pixels located in a same column and two adjacent rows;

obtaining a view angle value of a wide view angle, and determining a target difference value according to the view angle value; and reducing a gray scale value of one of the two pixels and/or increasing a gray scale value of the other of the two pixels according to the target difference value, to perform wide view angle adjustment of a picture to be displayed, where a difference value between the gray scale values of the two pixels after the wide view angle adjustment is greater than or equal to the target difference value.

In one embodiment, the processor 1001 can be configured to invoke the wide view angle adjustment program stored in the memory 1002 and perform the following operations:

obtaining a picture type of the picture to be displayed;

determining a target refresh rate according to the picture type;

determining the target difference value according to the target refresh rate and the view angle value; where the target refresh rate and the target difference value are positively correlated.

In one embodiment, the processor 1001 can be configured to invoke the wide view angle adjustment program stored in the memory 1002 and perform the following operations:

obtaining a preset difference value according to the view angle value, and determining a correction parameter according to the target refresh rate; and correcting the preset difference value according to the correction parameter to obtain the target difference value.

In one embodiment, the processor 1001 can be configured to invoke the wide view angle adjustment program stored in the memory 1002 and perform the following operations:

determining a preset refresh rate; and determining the preset difference value according to the view angle value, the preset refresh rate and the gray scale values of the two pixels.

In one embodiment, the processor 1001 can be configured to invoke the wide view angle adjustment program stored in the memory 1002 and perform the following operations:

determining the preset refresh rate;

in responding to that the picture to be display is a static picture according to the picture type, reducing the preset refresh rate to obtain the target refresh rate;

in responding to that the picture to be display is a dynamic picture according to the picture type, increasing the preset refresh rate to obtain the target refresh rate.

In one embodiment, the processor 1001 can be configured to invoke the wide view angle adjustment program stored in the memory 1002 and perform the following operations:

acquiring a previous display picture frame; and determining a second pixel of the previous display picture frame corresponding to a first pixel of a current display picture, and comparing a pixel value of the first pixel with a pixel value of the second pixels corresponding to the first pixel, where the current display picture is the picture to be displayed, and a display position of the first pixel and a display position of the second pixel corresponding to the first pixel is same on the display panel;

determining that the current display picture is a static picture according to the picture type in responding to that a number of first pixels whose pixel values are same as pixel values of corresponding second pixels is greater than a first preset number;

determining that the current display picture is a dynamic picture in responding to that a number of first pixels whose pixel values are different from pixel values of corresponding second pixels is greater than a second preset number.

In one embodiment, the processor 1001 can be configured to invoke the wide view angle adjustment program stored in the memory 1002 and perform the following operations:

a total brightness value of the two pixels before the wide view angle adjustment being equal to a total brightness value of the two pixels after the wide view angle adjustment.

In one embodiment, the processor 1001 can be configured to invoke the wide view angle adjustment program stored in the memory 1002 and perform the following operations:

saving a first target gray scale value of one of the two pixels and a second target gray scale value of another of the two pixels after the wide view angle adjustment, so as to apply an overdrive voltage corresponding to the first target gray scale value and an overdrive voltage corresponding to the second target gray scale value to liquid crystal molecules corresponding to the two pixels respectively to display the two pixels.

According to the above scheme of the present embodiment, the display panel acquires gray scale values of two pixels located in a same column and two adjacent rows, and then determine a view angle value of a wide view angle to determine a target difference value, so as to reduce a gray scale value of one of the two pixels, or increase a gray scale value of anther of the two pixels, or both reduce the gray scale value of the one of the two pixels and increase the gray scale value of the another of the two pixels according to the target difference value, to carry out wide view angle adjustment, and to make the difference value between the gray scale values of the two pixels after the wide view angle adjustment greater than or equal to the target difference value. Since the display panel integrates two pixels of the picture to be display located in a same column and two adjacent rows, and adjusts the difference value between the gray scale values of the two pixels to be greater than or equal to the target difference value, one pixel is darker and the other pixel is brighter, so as to meet users' demand for a wide view angle of a display picture without additional circuits and wires together with the circuits, and avoid to increase the area of the backlight lamp because of the reduction of aperture ratio. The adjustment cost of the display panel is lower.

Based on the above hardware architecture, an embodiment of a method for adjusting a wide view angle of the present application is proposed.

Figure 2:
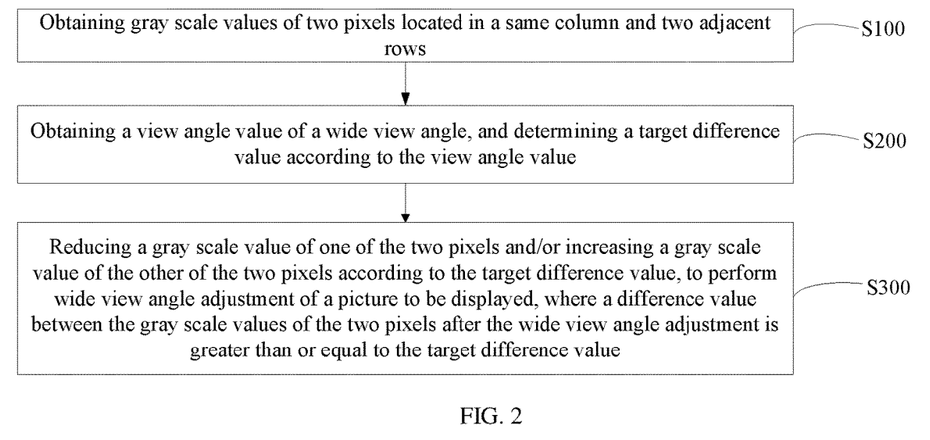
FIG. 2 is a flow diagram of an embodiment of a method for determining a wide view angle of the present application.

Referring to FIG. 2, FIG. 2 is an embodiment of the method for adjusting the wide view angle of the present application, which includes the following operations:

Operation S100, obtaining gray scale values of two pixels located in a same column and two adjacent rows.

In the present embodiment, the execution body of the method is a display panel. After receiving an image signal, the display panel analyzes the image signal to obtain a current display picture, and the current display picture is a picture to be displayed. The current display picture includes a plurality of pixels. Each pixel has a corresponding pixel value. Since there are many pixels in the current display picture, the pixel value of each pixel obtained by analyzing the image signal is compressed data. The display panel needs to further decompress the analyzed data to obtain the pixel value corresponding to each pixel, and then convert the pixel value into a gray scale value.

It should be noted that the image signal includes pixel values of two pixels located in a same column and two adjacent rows of the display panel, for example, a display position of one of the pixels are the first row and the first column, and a display position of the other of the pixels are the second row and the first column. That is, the display panel receives pixel values of two pixels at a time.

Operation S200, acquiring a view angle value of a wide view angle, and determining a target difference value according to the view angle value.

Operation S300, reducing a gray scale value of one of the two pixels and/or increasing a gray scale value of the other of the two pixels according to the target difference value, to perform wide view angle adjustment of the picture to be displayed, where a difference value between the gray scale values of the two pixels after the wide view angle adjustment is greater than or equal to the target difference value.

In this embodiment, the display panel adjusts gray scale values of two pixels so that one of the two pixels is bright and another is dark to meet the requirement of a wide view angle. It can be understood that the display panel is adjusted in the wide view angle, so that there is a difference value in the gray scale values of the two pixels, realizing that one pixel is darker and the other pixel is brighter. The display panel stores mapping relationships among view angle values of wide view angles, gray scale values of two pixels and target difference values. After determining the gray scale values of the two pixels, the corresponding target difference value can be determined according to the view angle value, the gray scale values of the two pixels and the mapping relationships. The difference value of the gray scale values of the two pixels after the wide view angle adjustment is greater than or equal to the target difference value, and the view angle value is the specific value of the wide view angle, for example, the view angle value is 150.

In addition, the gray scale values of the two pixels in the image signal may be set to be the same to reduce the calculation amount of the display panel. Because the gray scale values of the two pixels are the same, the display panel can reduce the gray scale value of one pixel, or increase the gray scale value of the other pixel, or both reduce the gray scale value of one pixel and increase the gray scale value of the other pixel. That is, the display panel can make the gray scale values of the two pixels different through the above three ways, thus realizing the adjustment of the wide view angle of the picture to be displayed. Of course, the gray scale values of the two pixels of the image signal may be different, and the display panel needs to reduce a smaller gray scale value, or increase a larger gray scale value, or both reduce the smaller gray scale value and increase the larger gray scale value according to the target difference value.

In an embodiment, the display panel needs to ensure the brightness of pixels when adjusting the wide view angle of the picture to be displayed. Two pixels are adjusted in a wide view angle as a whole, so it is necessary to ensure that the total brightness value of the whole is same. When the display panel determines the gray scale values of two pixels, the display panel calculates a total brightness value of the two pixels according to the gray scale values. When making a wide view angle adjustment, the gray scale value of one pixel is reduced, or the gray scale value of the other pixel is increased, or both the gray scale value of one pixel is increased and the gray scale value of the other pixel is reduced according to the total brightness value and the target difference value, so that the total brightness value of the two pixels after the wide view angle adjustment is equal to the total brightness value of the two pixels before the wide view angle adjustment.

After the two pixels are adjusted for a wide view angle, a first target gray scale value and a second target gray scale value are obtained, the first target gray scale value and the second target gray scale value are stored. When the display panel displays the two pixels, an overdrive voltage corresponding to the first target gray scale value and an overdrive voltage corresponding to the second target gray scale value are applied to liquid crystal molecules respectively corresponding to the two pixels. Specifically, assuming that the first target gray scale value is the gray scale value of the pixel of the first row and the first column, the second target gray scale value is the gray scale value of the pixel of the second row and the first column, the display panel applies an overdrive voltage corresponding to the first target gray scale value to the pixel of the first row and the first column so that the picture corresponding to the pixel is displayed on the display panel. After the display panel displays all the pixels in the first row, the stored second target gray scale value is extracted to apply an overdrive voltage corresponding to the second target gray scale value to liquid crystal molecules corresponding to the pixel of the first column and the second row to display a picture corresponding to the pixel on the display panel.

In the technical scheme provided by the present embodiment, the display panel acquires gray scale values of two pixels located in a same column and two adjacent rows, determines a view angle value of a wide view angle to determine a target difference value, so as to reduce a gray scale value of one pixel, or increase a gray scale value of the other pixel, or both reduce the gray scale value of one pixel and increase the gray scale value of the other pixel according to the target difference value, to carry out wide view angle adjustment, so that the difference value between the gray scale values of the two pixels after the wide view angle adjustment is greater than or equal to the target difference value. Since the display panel integrates two pixels of a picture to be displayed located in two adjacent rows and a same columns, and adjusts the difference value between the gray scale values of the two pixels to be greater than or equal to the target difference value, one pixel is darker and the other pixel is brighter, so as to meet users' demand for a wide view angle of a display picture without additional circuits and wires together with the circuits, and avoid to increase the area of the backlight lamp because of the reduction of aperture ratio. The adjustment cost of the display panel is lower.

Figure 3:
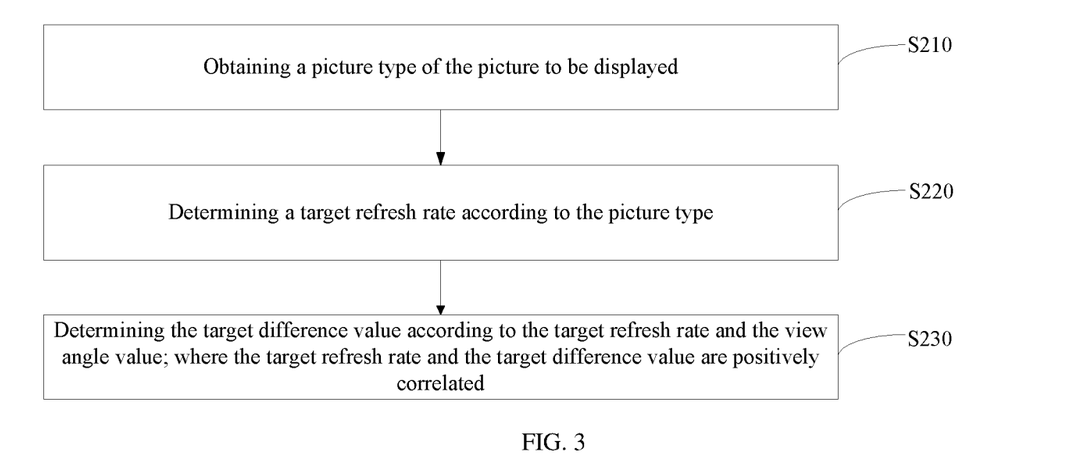
FIG. 3 is a detailed flow diagram of determining a target difference value in operation S200 of FIG. 2.

Referring to FIG. 3, FIG. 3 is a detailed flow diagram of determining a target difference in operation 200 of FIG. 2, which includes:

Operation S210, acquiring a picture type of the picture to be displayed.

Figure 4:
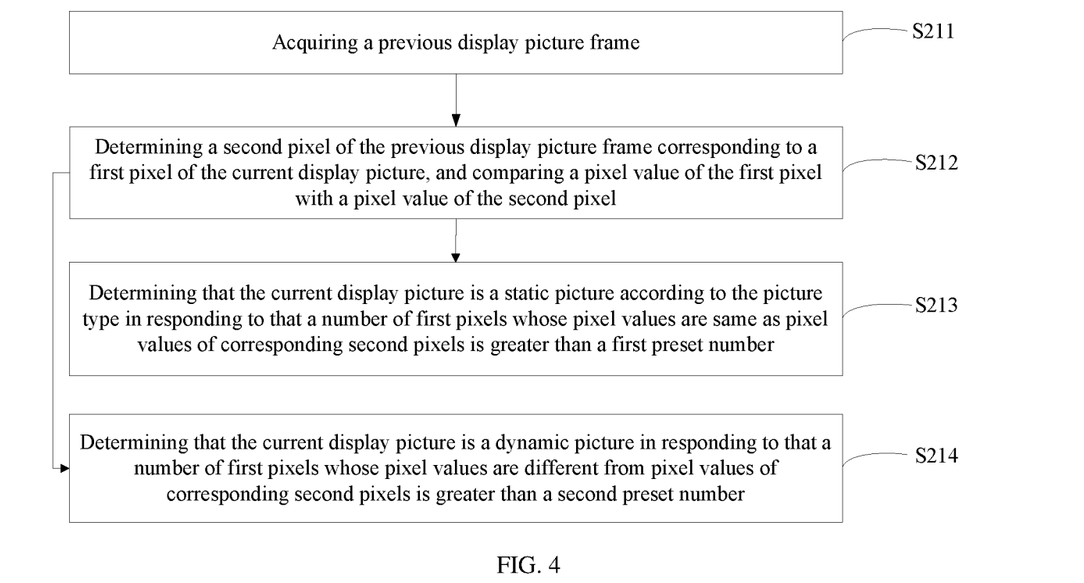
FIG. 4 is a detailed flow diagram of operation S210 in FIG. 3.

Display pictures are divided into a variety of picture types, which include dynamic pictures and static pictures. The display panel is provided with a DDR (Double Data Rate Synchronous Dynamic Random Access memory) for storing gray scale values of pixels of a previous display picture frame. The display panel can determine a picture type of the current display picture by comparing the current display picture with the previous display picture frame. Specifically, please refer to FIG. 4, the operation S210 includes:

Operation S211, acquiring a previous display picture frame;

Operation S212, determining a second pixel of the previous display picture frame corresponding to a first pixel of a current display picture, and comparing a pixel value of the first pixel with a pixel value of the second pixel, where the current display picture is the picture to be displayed;

Operation S213, in responding to that a number of first pixels which have pixel values same as pixel values of corresponding second pixels is greater than a first preset number, determining the current display picture is a static picture according to the picture type;

Operation S214, in responding to that a number of first pixels which have pixel values different from pixel values of corresponding second pixels is greater than a second preset number, determining the current display picture is a dynamic picture according to the picture type.

The display panel obtains a pixel value of each pixel of the previous display picture frame from the DDR, and defines each pixel of the previous display picture frame as a second pixel, and each pixel of the current display picture as a first pixel. The display panel further determines the second pixels corresponding to the first pixels one by one. Each first pixel and the second pixel corresponding to the first pixel have a same display position on the display panel. The display panel further compares the pixel values of the first pixels with the pixel values of the second pixels, and if the pixel value of each first pixel is the same as the pixel value of the second pixel corresponding to the first pixel, it indicates that the current display picture and the previous display picture frame are the same, and the current display picture is determined to be a static picture according to the picture type. If the current display picture contains one or more first pixel(s) whose pixel value(s) is(are) different from the pixel value(s) of the second pixel(s) corresponding to the first pixel(s), it indicates that the current display picture changes as compared to the previous display picture frame, and the current display picture is a dynamic picture according to the picture type.

In addition, the display panel can also determine the number of first pixels whose pixel values are same as pixel values of the second pixels corresponding to the first pixels. If the number is greater than a first preset number, it can be determined that the current display picture only changes in a small range as compared with the previous display picture frame, i.e., the current display picture is also defined as a static picture according to the picture type. The first preset number can be determined according to a total number of pixels and a proportion threshold. If the number is less than or equal to the first preset number, it can be determined that the current display picture has changed in a large range as compared with the previous display picture frame, i.e., the current display picture is defined as a dynamic picture according to the picture type.

Of course, the display panel can also determine a number of first pixels whose pixel values are different from the pixel values of the second pixels corresponding to the first pixels. If the number is greater than a second preset number, it can be determined that the current display picture has changed in a large range as compared with the previous display picture frame, i.e., the current display picture is defined as a dynamic picture according to the picture type. The second preset number can be determined according to the total number of pixels and a proportion threshold. If the number is less than or equal to the second preset number, it can be determined that the current display picture has changed in a small range as compared with the previous display picture frame, i.e., the current display picture is also defined as a static picture according to the picture type.

Operation S220, determining a target refresh rate according to the picture type.

The display panel can store a mapping relationship between picture types and refresh rates. The picture types include but are not limited to a dynamic picture and a static picture. The display panel can determine a refresh rate according to the mapping relationship and the picture type, and the refresh rate is the target refresh rate.

The display panel playing pictures according to a corresponding frame rate, for example, the frame rate being 200 indicates that the display panel can play 200 frames of pictures theoretically in one second. The refresh rate refers to the number of times electron beams repeatedly scan pictures on a screen. The refresh rate is the number of pictures actually played by the display panel in one second. The refresh rate is generally 60 Hz, i.e., the display panel actually plays 60 pictures in one second. It can be understood that, in general, the display panel selects 60 of the 200 pictures for display. In this embodiment, the refresh rate of a dynamic picture is higher than that of a static picture, the reason is that, the characters and scenes in the dynamic picture have changed greatly, if the refresh rate is low, for example, the refresh rate is 50 Hz, it indicates that four picture frames are not displayed on the display panel between a previous picture frame displayed immediately before a currently displayed picture frame and the currently displayed picture frame, thus causing incoherent movements of the people displayed on the display panel and even dragging phenomenon. Therefore, it is necessary to improve the refresh rate. However, when the current display picture is a static picture, the change of characters or scenes is small or even unchanged, so the refresh rate is small and there will be no movement incoherence or dragging of characters. At this time, the refresh rate can be appropriately reduced.

Operation S230, determining the target difference value according to the target refresh rate and the view angle value, where the target refresh rate and the target difference value are positively correlated.

In this embodiment, for the larger the refresh rate of the display panel, the shorter a charging time of a pixel charging circuit, when the pixel is displayed, the brightness corresponding to the pixel will be slightly lower, resulting in an actual view angle value of the display panel being smaller than a set view angle value. In responding to this, the display panel stores a mapping relationship among target refresh rates, view angle values, gray scale values of the two pixels and difference values, and determines the target difference value according to the view angle value, the target refresh rate and the gray scale values of the two pixels after obtaining the view angle value. It should be noted that the larger the target refresh rate, the larger the target difference value, i.e. the target refresh rate and the target difference value have a positive correlation.

In the technical scheme provided by this embodiment, the display panel acquires a picture type of the picture to be displayed, determines a target refresh rate according to the picture type, and determines a target difference value according to the target refresh rate and the view angle value, so that the display panel adjusts the refresh rate according to the picture type of the current display picture, and determines a target difference value corresponding to a wide view angle according to the adjusted refresh rate, thereby the view angle value of the wide view angle of the picture displayed by the display panel meeting the requirements of users.

Figure 5:
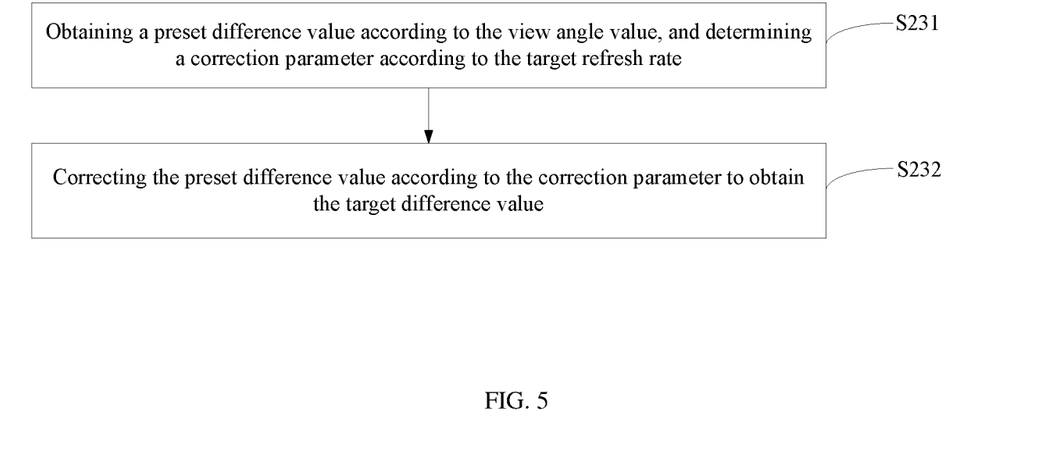
FIG. 5 is a detailed flow diagram of operation S230 in FIG. 3.

Referring to FIG. 5, FIG. 5 is a detailed flow diagram of operation S230 in FIG. 3, which includes:

Operation S231, obtaining a preset difference value according to the view angle value, and determining a correction parameter according to the target refresh rate;

Operation S232, correcting the preset difference value according to the correction parameter to obtain the target difference value.

In this embodiment, the display panel stores a lookup table about view angle values, gray scale values and difference values, and the display panel can look up the difference value corresponding to the gray scale values of the two pixels and the view angle value in the lookup table, and the difference value is the preset difference value. However, the establishment of the lookup table is based on testing the display panel under the preset refresh rate. Therefore, the lookup table of the display panel is actually a look-up table about correspondences of the view angle value of a wide view angle, the preset refresh rate, the gray scale values of two pixels and the difference values. The display panel can determine the difference value corresponding to the gray scale values of the two pixels in the lookup table according to the view angle value of the wide view angle and the preset refresh rate, and the difference value is the preset difference value.

Since the target refresh rate is different from the preset refresh rate, and the display panel only stores a lookup table corresponding to the preset refresh rate, the display panel needs to correct the preset difference value according to the target refresh rate and the preset refresh rate to obtain the target difference value. Specifically, the display panel can determine a correction parameter according to the target refresh rate, and the correction parameter can be an incremental value, a decremental value or a correction coefficient. The correction parameter can be determined according to values of the target refresh rate and the preset refresh rate. When the target refresh rate is greater than the preset refresh rate, the correction parameter can be an incremental value or the correction coefficient be greater than 1. When the target refresh rate is less than the preset refresh rate, the correction parameter is a decremental value or the correction coefficient be less than 1.

The display panel superimposes the preset difference value with the incremental value or the decremental value to obtain the target difference value, or the display panel multiplies the preset difference value by the correction coefficient to obtain the target difference value.

In one embodiment, when the current display picture is a static picture, a decreasing amount of the preset refresh rate can be determined according to the number of pixels of the current display picture that have changed, and the changed pixels here refer to pixels of the current display picture different from corresponding pixels of the previous display picture frame. Specifically, the display panel calculates a number of first pixels whose pixel values different from those of second pixels values corresponding to the first pixels. A first proportion is obtained by dividing the total number of pixels of the current display picture by the number of the first pixels whose pixel values different from those of second pixels corresponding to the first pixels. The first proportion has a mapping relationship with the decreasing amount. The display panel can determine the decreasing amount according to the first proportion. The larger the first proportion, the larger the preset refresh rate after be decreased, that is, the first proportion has a positive correlation relationship with the target refresh rate. Of course, the display panel can also determine a number of first pixels whose pixel values is same as those of second pixels corresponding to the first pixels, thus to obtain a second proportion. The second proportion has a mapping relationship with the decreasing amount, thereby decreasing the preset refresh rate according to the second proportion to obtain the target refresh rate, the larger the second proportion, the smaller the target refresh rate.

Similarly, when the current display picture is a dynamic picture, the display panel can obtain a corresponding increasing amount according to the above principle, the larger a third proportion corresponding to a number of first pixels whose pixel values being different from those of second pixels corresponding to the first pixels from the total number of the pixels of the current display picture, the larger the target refresh rate. The larger a fourth proportion corresponding to a number of first pixels whose pixel values being same to those of second pixels corresponding to the first pixels from the total number of the pixels of the current display picture, the smaller the target refresh rate.

The disclosure also provides a display panel including a memory and at least one processor, the memory stores computer-executable instructions executable by the at least one processor, the computer-executable instructions is executed by the at least one processor to cause the at least one processor to perform the following operations:

obtaining gray scale values of two pixels located in a same column and two adjacent rows;

obtaining a view angle value of a wide view angle, and determining a target difference value according to the view angle value; and reducing a gray scale value of one of the two pixels and/or increasing a gray scale value of the other of the two pixels according to the target difference value, to perform wide view angle adjustment of a picture to be displayed, where a difference value between the gray scale values of the two pixels after the wide view angle adjustment is greater than or equal to the target difference value.

The application also provides a computer-readable storage medium storing computer-executable instructions executable by at least one processor, when the computer-executable instructions are executed by the at least one processor, the at least one processor is caused to perform the following operations:

obtaining gray scale values of two pixels located in a same column and two adjacent rows;

obtaining a view angle value of a wide view angle, and determining a target difference value according to the view angle value; and reducing a gray scale value of one of the two pixels and/or increasing a gray scale value of the other of the two pixels according to the target difference value, to perform wide view angle adjustment of a picture to be displayed, where a difference value between the gray scale values of the two pixels after the wide view angle adjustment is greater than or equal to the target difference value.

The above-mentioned serial numbers of embodiments of the present disclosure are for illustration only and do not represent the advantages or disadvantages of the embodiments.

It should be noted that, in this document, the terms "include", "comprise" or any other variation thereof are intended to encompass non-exclusive inclusion such that a process, method, article, or device that includes a series of elements includes not only those elements, but also other elements that are not explicitly listed, or also elements inherent to such a process, method, article, or device. Without further restrictions, an element defined by the statement "including a . . . " does not exclude the existence of other identical elements in the process, method, article or device that includes the element.

From the above description of embodiments, it will be apparent to those skilled in the art that methods of the above embodiments can be implemented by means of software plus a necessary universal hardware platform, of course they may also be implemented by means of hardware, but in many cases the former is an optional embodiment. Based on such an understanding, the technical schemes of the disclosure in essence or the part that contributes to the related art can be embodied in the form of software products. The computer software product is stored in a storage medium (e.g., a ROM/RAM, a disk, an optical disk) as described above and includes several instructions to cause a terminal device (which may be a mobile phone, a computer, a server, a television, a network device, etc.) to perform the methods described in various embodiments of the present disclosure.

The above are only alternative embodiments of the disclosure and they are not thereby limiting the scope of the patent of the disclosure. Any equivalent structure change or equivalent flow change made by utilizing the contents of the specification and the accompanying drawings of the disclosure, or any direct or indirect application to other related technical fields, is likewise included in the claimed scope of the disclosure.

What is claimed is:

1. A method for adjusting a wide view angle, comprising:
obtaining gray scale values of two pixels located in a same column and two adjacent rows;
obtaining a view angle value of a wide view angle, and determining a target difference value according to the view angle value; and
reducing a gray scale value of one of the two pixels and/or increasing a gray scale value of another one of the two pixels according to the target difference value, to perform wide view angle adjustment of a picture to be displayed, wherein a difference value between the gray scale values of the two pixels after the wide view angle adjustment is greater than or equal to the target difference value.

2. The method of claim 1, wherein the operation of determining a target difference value according to the view angle value comprises:
obtaining a picture type of the picture to be displayed;
determining a target refresh rate according to the picture type;
determining the target difference value according to the target refresh rate and the view angle value; wherein the target refresh rate and the target difference value are positively correlated.

3. The method of claim 2, wherein the operation of determining the target difference value according to the target refresh rate and the view angle value comprises:
obtaining a preset difference value according to the view angle value, and determining a correction parameter according to the target refresh rate; and
correcting the preset difference value according to the correction parameter to obtain the target difference value.

4. The method of claim 3, wherein the operation of obtaining a preset difference value according to the view angle value comprises:
determining a preset refresh rate; and
determining the preset difference value according to the view angle value, the preset refresh rate and the gray scale values of the two pixels.

5. The method of claim 2, wherein the picture type comprises a static picture and a dynamic picture, and the operation of determining a target refresh rate according to the picture type comprises:
determining a preset refresh rate;
in responding to that the picture to be display is a static picture according to the picture type, reducing the preset refresh rate to obtain the target refresh rate;
in responding to that the picture to be display is a dynamic picture according to the picture type, increasing the preset refresh rate to obtain the target refresh rate.

6. The method of claim 2, wherein the operation of determining a picture type of the current display picture comprises:
acquiring a previous display picture frame;
determining a second pixel of the previous display picture frame corresponding to a first pixel of a current display picture, and comparing a pixel value of the first pixel with a pixel value of the second pixels corresponding to the first pixel, wherein the current display picture is the picture to be displayed, and a display position of the first pixel and a display position of the second pixel corresponding to the first pixel is same on a display panel;
determining that the current display picture is a static picture according to the picture type in responding to that a number of first pixels whose pixel values are same as pixel values of corresponding second pixels is greater than a first preset number; and
determining that the current display picture is a dynamic picture in responding to that a number of first pixels whose pixel values are different from pixel values of corresponding second pixels is greater than a second preset number.

7. The method of claim 1, wherein a total brightness value of the two pixels before the wide view angle adjustment is equal to a total brightness value of the two pixels after the wide view angle adjustment.

8. The method of claim 1, wherein after the operation of reducing a gray scale value of one of the two pixels and/or increasing a gray scale value of another one of the two pixels according to the target difference value, the method further comprises:
saving a first target gray scale value of the one of the two pixels and a second target gray scale value of the another one of the two pixels after the wide view angle adjustment, thereby applying an overdrive voltage corresponding to the first target gray scale value and an overdrive voltage corresponding to the second target gray scale value to liquid crystal molecules corresponding to the two pixels respectively to display the two pixels.

9. A display panel comprising a memory and at least one processor, the memory storing computer-executable instructions executable by the at least one processor, when the computer-executable instructions are executed by the at least one processor, the at least one processor is caused to perform the following operations:
obtaining gray scale values of two pixels located in a same column and two adjacent rows;
obtaining a view angle value of a wide view angle, and determining a target difference value according to the view angle value; and
reducing a gray scale value of one of the two pixels and/or increasing a gray scale value of another one of the two pixels according to the target difference value, to perform wide view angle adjustment of a picture to be displayed, wherein a difference value between the gray scale values of the two pixels after the wide view angle adjustment is greater than or equal to the target difference value.

10. The display panel of claim 9, wherein the operation of determining a target difference value according to the view angle value comprises:
obtaining a picture type of the picture to be displayed;
determining a target refresh rate according to the picture type;
determining the target difference value according to the target refresh rate and the view angle value; wherein the target refresh rate and the target difference value are positively correlated.

11. The display panel of claim 10, wherein the operation of determining the target difference value according to the target refresh rate and the view angle value comprises:
obtaining a preset difference value according to the view angle value, and determining a correction parameter according to the target refresh rate; and
correcting the preset difference value according to the correction parameter to obtain the target difference value.

12. The display panel of claim 11, wherein the operation of obtaining a preset difference value according to the view angle value comprises:
determining a preset refresh rate; and
determining the preset difference value according to the view angle value, the preset refresh rate and the gray scale values of the two pixels.

13. The display panel of claim 10, wherein the picture type comprises a static picture and a dynamic picture, and the operation of determining a target refresh rate according to the picture type comprises:

determining a preset refresh rate;
in responding to that the picture to be display is a static picture according to the picture type, reducing the preset refresh rate to obtain the target refresh rate;
in responding to that the picture to be display is a dynamic picture according to the picture type, increasing the preset refresh rate to obtain the target refresh rate.

14. The display panel of claim 10, wherein the operation of determining a picture type of the currently displayed picture comprises:
acquiring a previous display picture frame; and
determining a second pixel of the previous display picture frame corresponding to a first pixel of a current display picture, and comparing a pixel value of the first pixel with a pixel value of the second pixels corresponding to the first pixel, wherein the current display picture is the picture to be displayed, and a display position of the first pixel and a display position of the second pixel corresponding to the first pixel is same on a display panel;
determining that the current display picture is a static picture according to the picture type when a number of first pixels whose pixel values are same as pixel values of corresponding second pixels is greater than a first preset number; and
determining that the current display picture is a dynamic picture when a number of first pixels whose pixel values are different from pixel values of corresponding second pixels is greater than a second preset number.

15. A computer-readable storage medium, wherein the computer-readable storage medium stores computer-executable instructions executable by at least one processor, when the computer-executable instructions are executed by the at least one processor, the at least one processor is caused to perform the following operations:
obtaining gray scale values of two pixels located in a same column and two adjacent rows;
obtaining a view angle value of a wide view angle, and determining a target difference value according to the view angle value; and
reducing a gray scale value of one of the two pixels and/or increasing a gray scale value of another one of the two pixels according to the target difference value, to perform wide view angle adjustment of a picture to be displayed, wherein a difference value between the gray scale values of the two pixels after the wide view angle adjustment is greater than or equal to the target difference value.

16. The computer-readable storage medium of claim 15, wherein the operation of determining a target difference value according to the view angle value comprises:
obtaining a picture type of the picture to be displayed;
determining a target refresh rate according to the picture type;
determining the target difference value according to the target refresh rate and the view angle value; wherein the target refresh rate and the target difference value are positively correlated.

17. The computer-readable storage medium of claim 16, wherein the operation of determining the target difference value according to the target refresh rate and the view angle value comprises:
obtaining a preset difference value according to the view angle value, and determining a correction parameter according to the target refresh rate; and
correcting the preset difference value according to the correction parameter to obtain the target difference value.

18. The computer-readable storage medium of claim 17, wherein the operation of obtaining a preset difference value according to the view angle value comprises:
determining a preset refresh rate; and
determining the preset difference value according to the view angle value, the preset refresh rate and the gray scale values of the two pixels.

19. The computer-readable storage medium of claim 16, wherein the picture type comprises a static picture and a dynamic picture, and the operation of determining a target refresh rate according to the picture type comprises:
determining a preset refresh rate;
in responding to that the picture to be display is a static picture according to the picture type, reducing the preset refresh rate to obtain the target refresh rate;
in responding to that the picture to be display is a dynamic picture according to the picture type, increasing the preset refresh rate to obtain the target refresh rate.

20. The computer-readable storage medium of claim 16, wherein the operation of determining a picture type of the currently displayed picture comprises:
acquiring a previous display picture frame; and
determining a second pixel of the previous display picture frame corresponding to a first pixel of a current display picture, and comparing a pixel value of the first pixel with a pixel value of the second pixels corresponding to the first pixel, wherein the current display picture is the picture to be displayed, and a display position of the first pixel and a display position of the second pixel corresponding to the first pixel is same on a display panel;
determining that the current display picture is a static picture according to the picture type when a number of first pixels whose pixel values are same as pixel values of corresponding second pixels is greater than a first preset number; and
determining that the current display picture is a dynamic picture when a number of first pixels whose pixel values are different from pixel values of corresponding second pixels is greater than a second preset number.

* * * * *